United States Patent
Caufield et al.

(10) Patent No.: US 7,721,279 B1
(45) Date of Patent: May 18, 2010

(54) PACKAGING INFORMATION INTEGRATION APPLICATIONS

(75) Inventors: Brian K. Caufield, Livermore, CA (US); Hung B. Nguyen, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/361,219

(22) Filed: Jan. 28, 2009

(51) Int. Cl.
*G06F 9/44* (2006.01)

(52) U.S. Cl. ................ 717/170; 717/168; 717/169; 717/173

(58) Field of Classification Search .............. 717/173
See application file for complete search history.

(56) References Cited

U.S. PATENT DOCUMENTS

| | | | |
|---|---|---|---|
| 6,457,170 B1 | 9/2002 | Boehm et al. | |
| 6,493,871 B1* | 12/2002 | McGuire et al. | 717/173 |
| 6,928,579 B2* | 8/2005 | Aija et al. | 714/6 |
| 7,366,768 B2 | 4/2008 | Deo et al. | |
| 2005/0149925 A1* | 7/2005 | Pichetti et al. | 717/177 |
| 2006/0165223 A1 | 7/2006 | Dugan et al. | |
| 2007/0050762 A1* | 3/2007 | Chen et al. | 717/169 |
| 2008/0154983 A1 | 6/2008 | Lee et al. | |
| 2009/0055817 A1* | 2/2009 | Maj | 717/173 |

OTHER PUBLICATIONS

"Reusable Asset Specification OMG Available Specification" [online] Object Management Group, Ver. 2.2, Nov. 2, 2005, [retrieved Jan. 26, 2009] retrieved from the Internet: <http://www.omg.org/cgi-bin/doc?formal/2005-11-02>.

* cited by examiner

*Primary Examiner*—Thomas K Pham
(74) *Attorney, Agent, or Firm*—Patents On Demand, P.A.; Brian K. Buchheit (57) ABSTRACT

An embodiment of the present invention discloses an enterprise application packaging method and archive file. Applications and support components are developed by a developer, which are then included in the archive file. A revision control file indicates which files correlate to a present revision of the application package. A naming convention is applied to the application and support component files to indicate versions which correspond to each other. The archive file contains the file corresponding to the present version, as well as previous versions, as well as previous version revision control files so that, in the event of a failure or other error, the executing machine may revert to a previous version.

12 Claims, 5 Drawing Sheets

PACKAGING INFORMATION INTEGRATION APPLICATIONS

BACKGROUND

The present invention relates to the field of software development and deployment, and more particularly to packaging integration application components for deployment.

In general, software applications are developed modularly, where each module is designed to perform a specific, limited process or function. Modularizing tasks and processes allows the various software components to be tested and altered as necessary in the development process, and also allows easier updates and modifications to published and deployed software in use. The modularization approach to software development has been adopted in a wide variety of software-related fields. The information integration field is one such field.

Information integration describes utilizing various information sources in an enterprise to accomplish some result. An enterprise is typically organized into units or departments, each of which produces information as a result of various activities. Each of these sources of information can be used to drive enterprise operations. For example, sales information may be used to generate forecasts, and thus drive human resource allocation and purchasing activities for a manufacturer. Integration projects are increasingly designed using graphical integration development tools, such as DataStage manufactured by International Business Machines Corporation (IBM). Graphical integration project tools allow developers to design integration applications in a graphical environment, where data, processes, and work flows are represented graphically, where parametric values may be assigned to and specified for graphical entities representing the data, processes, and flows.

A typical integration project will use the modular development approach, where a set of integration applications are designed to accomplish the goal of the project. Furthermore, the integration project will typically include application support components, which may include special libraries and other data. Prior art integration approaches distribute present revisions of application packages, which leave enterprise systems with no backup in the event of a software failure or other error. Therefore, there is need for a means by which present versions of application packages may be made available, but also allow enterprise equipment to have a fall back version of applications and application support components.

BRIEF SUMMARY

The invention provides a method of packaging information integration components in a computing system, and a computer program product containing instruction code for executing the method. The method commences in one embodiment by identifying integration applications and application support components to be included in an information integration package, including identifying available current and previous versions of the applications and the application support components. The applications may be stored in a proprietary format for use with an integration application design tool on a machine readable storage medium. The method then commences renaming the applications and application support components using a naming convention which retains a base name and adds a name annotation which distinguishes versions of the application and application support components. Subsequently, the method further generates a revision control file which lists the renamed application and application support components and indicates which of the renamed application and application support components are included in a present revision. Once the applications and support components are identified, the method then commences archiving the renamed application, application support components, and revision control file together in a distribution file.

DETAILED DESCRIPTION

The present invention discloses a solution for enterprise applications and support components. More specifically, the invention includes a process for identifying application and support components for a present build, retrieving the applications and support components and putting them into a transferable form for use by enterprise entities, and packaging them together in a way that includes previous revisions to allow machines using the applications to fall back to previous revisions should an error or failure occur.

As will be appreciated by one skilled in the art, the present invention may be embodied as a method performed by a machine, system, or computer program product. Accordingly, the present invention may take the form of an entirely hardware embodiment, a software embodiment (including firmware, resident software, micro-code, etc.) executed on a computing machine, or an embodiment combining software executed by a machine with other hardware aspects that may all generally be referred to herein as a "circuit," "module" or "system." Furthermore, the present invention may take the form of a computer program product on a machine-readable storage medium having computer-usable program code contained in the medium. In a preferred embodiment, the invention is implemented on a computing machine executing software instructions, which includes but is not limited to firmware, resident software, microcode, etc.

Furthermore, the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution machine system, apparatus, or device.

Any suitable computer usable or computer readable storage medium may be utilized. The computer-usable or computer-readable storage medium may be, for example but not limited to, an electronic, magnetic, optical, or semiconductor system, apparatus, or device. Examples of a computer-readable storage medium include a semiconductor or solid state memory, magnetic tape, a removable computer diskette, a random access memory (RAM), a read-only memory (ROM), an erasable programmable read-only memory (EPROM) or Flash memory, a rigid magnetic disk and an optical disk. Current examples of optical disks include compact disk read only memory (CD-ROM), compact disk-read/write (CD-R/W) and DVD.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Under no circumstance, however, should the invention be interpreted as software per se.

Figure 1:
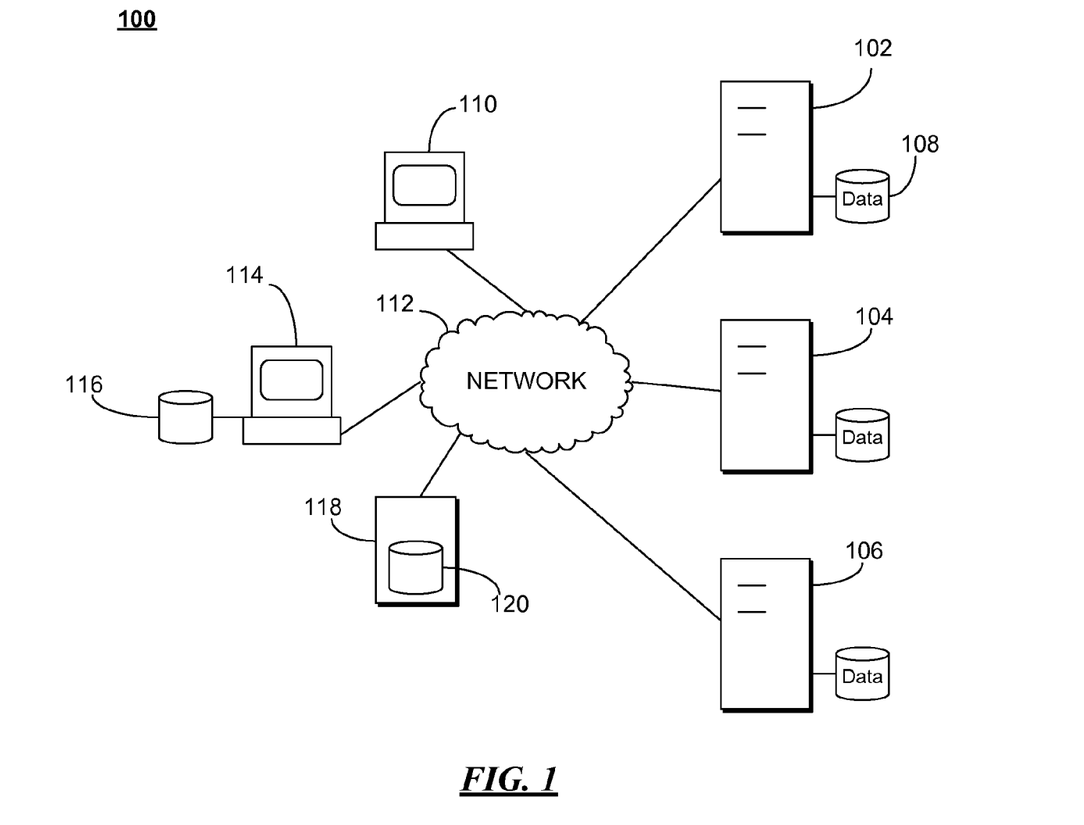
FIG. 1 is an enterprise system, in accordance with an embodiment of the invention.

FIG. 1 is an enterprise system 100, in accordance with an embodiment of the invention. The enterprise includes one or more enterprise servers 102, 104, 106 which provide services, and data to requesting clients 110 and other enterprise servers. Each enterprise server may be used in a process flow for accomplishing an enterprise task, and may serve as an intermediary in performing work in furtherance of the task. Each enterprise server may have its own data store such as data store or database 108 which it maintains, and uses to perform specified processes. A user at a client station 110 may request the enterprise to perform an enterprise task, and receive results of the task. The task may be any of numerous enterprise functions, such as, for example, analyzing business data, providing reports, cash flow analysis, and so on, as is well known. A developer 114 develops and provides applications for execution by the enterprise servers to accomplish various enterprise tasks. Prior to releasing applications packages for execution, the applications and support components are stored in a data store 116, which may be secured from the rest of the enterprise. As shown here, the developer 114 and data store 116 indicate a client-centric development arrangement. More typically development occurs using a development server 118 with a server data store 120 which is accessible by a plurality of developer machines, such as developer station 114. The server data store will contain application and application support components. Access to, and revision control of applications under development may be controlled conventionally. The developer may use unit testing and integration testing environments prior to releasing enterprise application packages, as is known. All of the enterprise components are connected via a network 112, which may be any combination of conventional networking means.

Figure 2:
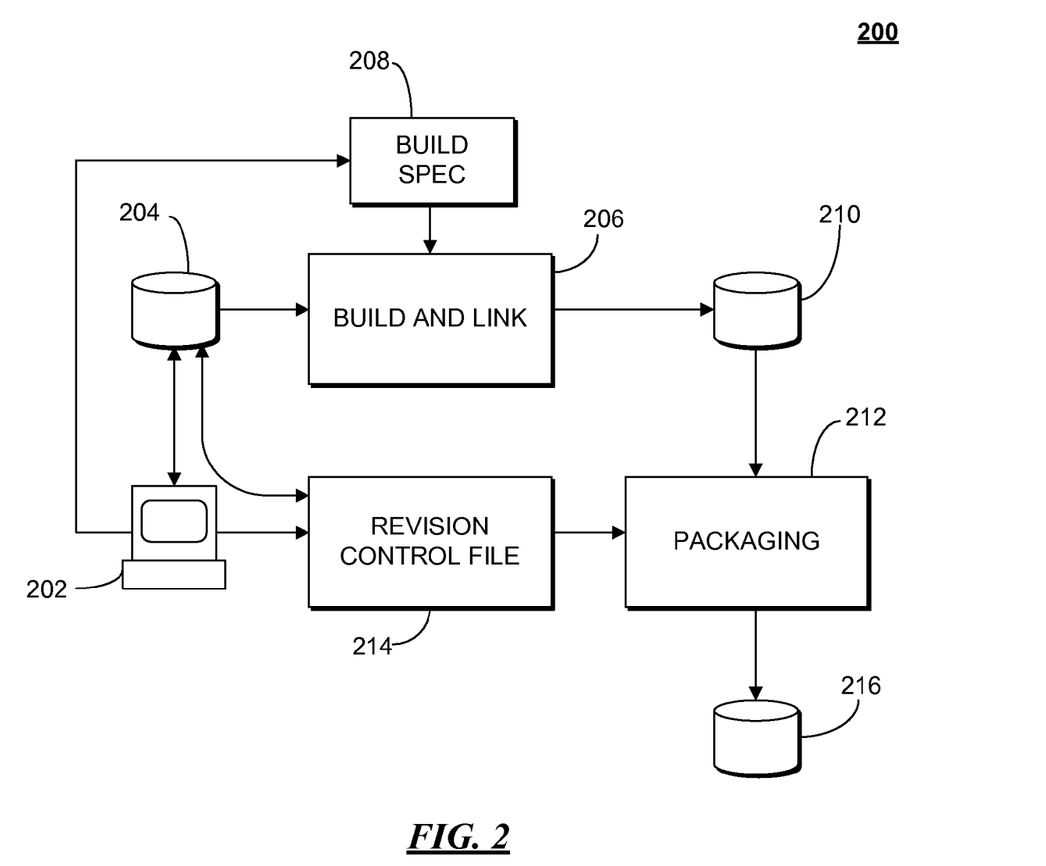
FIG. 2 is a build process diagram, in accordance with an embodiment of the invention.

FIG. 2 is a build process diagram 200, in accordance with an embodiment of the invention. One of more developer stations such as station 202 may be coupled to a repository 204. The repository contains enterprise applications and application support components designed and developed by a developer. The applications and application support components may be developed using an enterprise application development tool, which allow design of applications in, for example, a graphical format, or some other proprietary, non-executable format. By proprietary it is meant that the file format is one that is particular to the enterprise application development tool, and not a format widely used, such as text or rich text. A build and link module 206 is performed by a computing machine under direction of appropriate software and instruction code. The build and link module may use a build specification 208 which may be provided by the developer. The build specification identifies which applications and application support components are to be used in the present revision. The build and link module fetches the identified applications and application support components from the development data store 204, and may compile them into an executable or otherwise transferable format, and put them into another data store 210, which may be a different storage device from development store 204, or different memory space in the same storage device used for development data store 204. A packaging module 212 identifies applications and application support components to be included in a present revision of the application package. The packaging module is a computing machine operating in accordance with appropriate software or instruction code. It may be executed by the same machine as used for the build and link module 206, or a separate, dedicated machine may be used. The packaging module first obtains any previous versions of application package, if any. The present revision being packaged is controlled by a revision control file 214. The revision control file indicates which applications and application support components are to be included, and designated for use with the present version. The packaging module uses the revision control file to fetch the appropriate versions of applications and application support components from the data store 210, and applies a naming convention to the application and application support components. The naming convention preserves at least a portion of the file name, and adds a naming annotation indicating the present revision. Previous versions of applications, as well as obsolete applications and support components are left in the package by the packing module, as well as previous revision control files, along with present versions of applications, support components, and the present revision control file.

Figure 3:
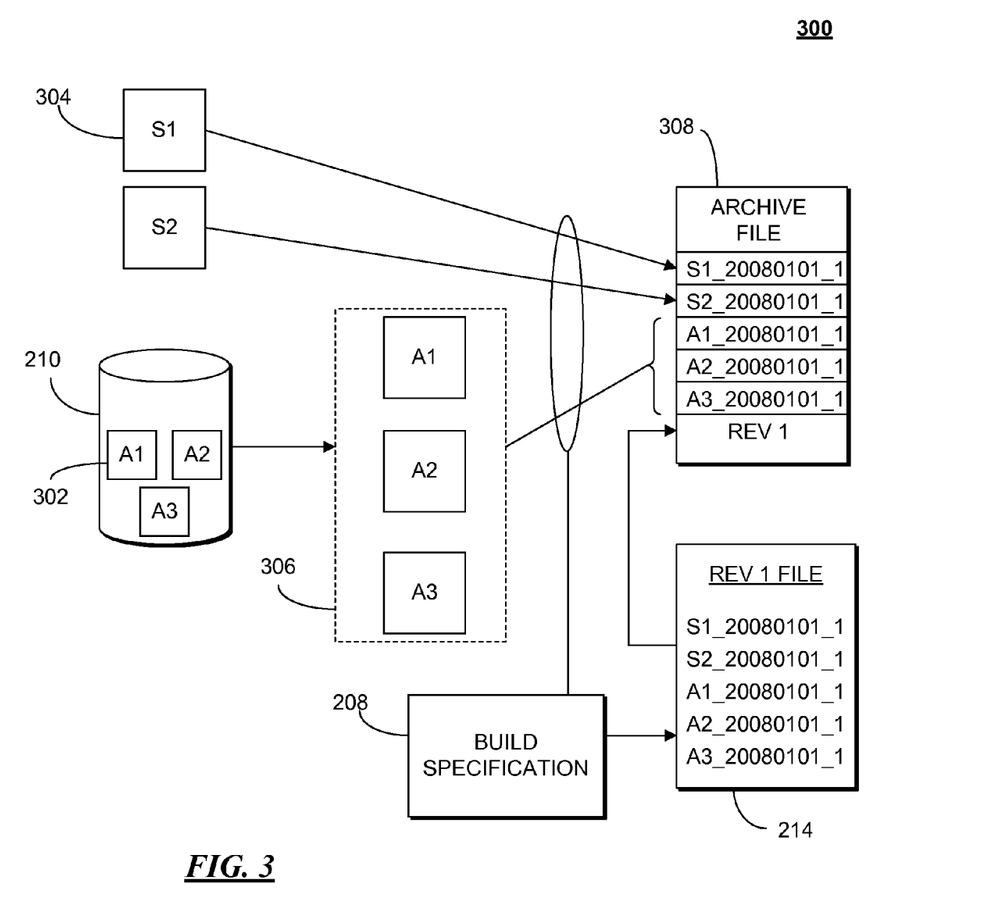
FIG. 3 is an initial archiving diagram, in accordance with an embodiment of the invention.

FIG. 3 is an initial archiving diagram 300, in accordance with an embodiment of the invention. A data store 210 stores applications having base names A1 (302), A2, and A3. Support components S1 (304) and S2 may likewise be stored in the data store, or stored separately. A build specification 208 indicates which applications and support components are to be included, as well as the format or formats in which they are to be provided. The build specification further determines the content of the revision control file 214. The revision control file 214 indicates which applications and application support components are to be included in the present build, referring to file names using a naming convention. As can be seen application A1 (302) receives a name annotation "20080101_1" as does support component S1 (304) in the revision control file. Thus, the base name, or at least a portion of the base name is retained. Any naming convention may be used, but it is preferable to use a standardized naming convention, such as shown, where, for example, a time stamp such as the year (2008101 being Jan. 1 of 2008) and/or date of development is concatenated with a build number ("_1"). The annotation may also act as a package identifier, indicating the latest versions of files to be used. The applications are selected 306 by the packaging module and renamed using the naming convention, and placed into an archive file 308, along with the revision control file. It should be noted that the applications may be provided in the archive in one or more formats, including executable forms, as well as application designs, and other forms.

Figure 4:
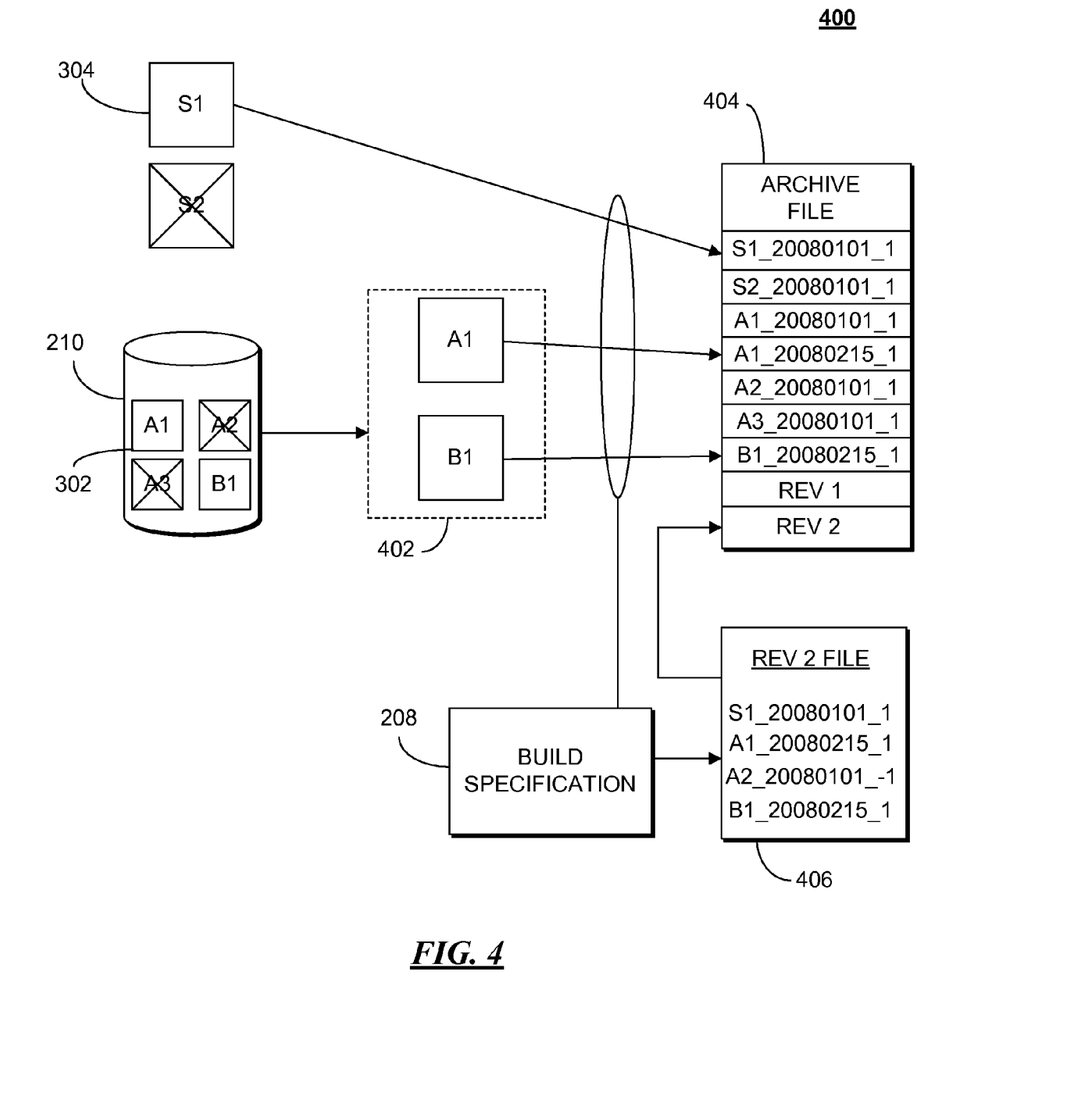
FIG. 4 is a subsequent archiving diagram, in accordance with an embodiment of the invention.

FIG. 4 is a subsequent archiving diagram 400, in accordance with an embodiment of the invention. In this diagram a subsequent version of the application package is being constructed. In the present example, the build specification 208 indicates that S2, A2, and A3 are not used, and B1 is newly developed and being added. In addition, A1 has been revised, and A2 has been deleted from the data store. Accordingly, the new version of A1 is included along with B1 (402) in an appropriate format or formats. A present revision control file 406 indicates the additional files to be used in the present archive, as well as the naming annotation to be used. The deletion of A2 is indicated by the "−1" appended to the file name in the revision control file. Accordingly, a new archive file 404 contains older versions of applications and application support components, as well as those used for the present version, as well as the previous and present revision control files. The archive may contain the entire history of files, or a limited number of previous versions. The most recent revision file indicates to the enterprise servers and other machines which applications and support components are to be loaded for execution. However, by including previous versions, and previous revision control files, should there be a failure or error, the enterprise servers may use previous versions to continue working and performing requested tasks when possible. Upon being assembled, the archive file may then be distributed to the appropriate enterprise servers and other machines for execution. The archive file may be formatted in a portable format, allowing it to be used by a variety of operating systems.

Figure 5:
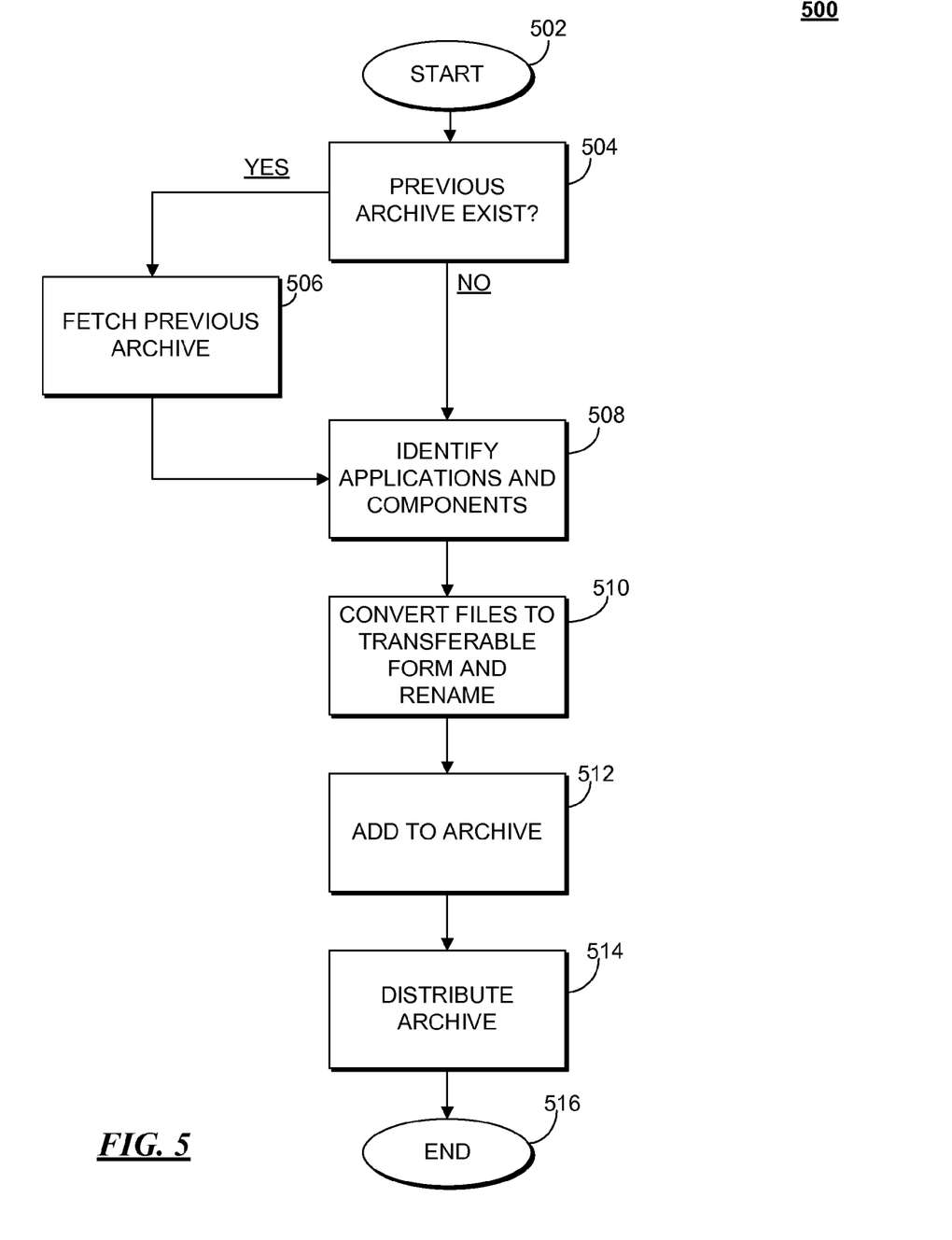
FIG. 5 is a flow chart diagram of a method of packaging integration components, in accordance with an embodiment of the invention.

FIG. 5 is a flow chart diagram 500 of a method of packaging integration components, in accordance with an embodiment of the invention. At the start (502) the system is ready to build the archive file for a present version, meaning the necessary machines are powered up and ready to perform the necessary functions in accordance with the teachings herein. The system generates a revision control file indicating the applications and support components to be included in the present revision. The system may check for previous versions of the archive (504). And previous versions, and in particular the most recent version, maybe used as a starting point. If there is a previous version of the archive, it is fetched (506) and used as a starting point. Applications and application support components for the present build are then identified (508), as indicated by the revision control file and/or build specification. If necessary, applications stored in a proprietary format may be converted to an executable binary or other transferable format (510). The build process creates transferable forms of the applications and application support components, which may include executable form of the applications and support components as well as other versions such as dataflow designs for use by other machines or developers or as backup versions. This allows, for example, a machine receiving the archive to have both a design and an executable available, if so desired. The files are also renamed using the naming convention to identify files included in the present revision. Once formatted and renamed, the application files and support components are added to the archive (512). The archive may then be distributed (514) to the various enterprise nodes, whereupon the process ends (516).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of packaging information integration components in a computing system, comprising:

determining an existence for a current version of an application having at least one previous version wherein each previous version is associated with a version specific revision control file, wherein each revision control file indicates a set of applications and application support components that correspond to a specific version of the application;

identifying integration applications and application support components to be included in a distribution archive file comprising integration applications, application support files, and revision control files for said current version of the application and for each of the at least one previous version of the application, wherein said identifying includes identifying available current and previous versions of the applications and the application support components, wherein the applications are stored in a proprietary format for use with an integration application design tool on a machine readable storage medium;

renaming the applications and application support components using a naming convention which retains a base name and adds a name annotation which distinguishes versions of the application and application support components, wherein said renaming prevents name conflicts when the applications and application support components for a plurality of different versions of the application are placed in the distribution archive file;

generating a current revision control file for the current version of the application which lists the renamed application and application support components and indicates which of the renamed application and application support components are included in the current version of the application; and archiving the renamed application, application support components, and current revision control file together in the distribution archive file as application and application support components for the current version of the application, wherein after said archiving said distribution archive file comprises a plurality of different versions of the application including said at least one previous version and said current version, and wherein the distribution archive file comprises a version specific revision control file for each of the plurality of different versions, one of said version specific revision control files comprising said current revision control file.

2. The method of claim 1, wherein applying the naming convention comprises adding a name annotation to a file name of each of the application and application support components, wherein the name annotation is standardized, wherein applying the naming convention comprises integrating a time stamp into the name annotation and comprises including a package identifier in the name annotation.

3. The method of claim 1, further comprising transforming the identified applications and application support components into a binary form in a memory of the computing system prior to archiving, wherein the distribution archive file is formatted in a portable format.

4. The method of claim 1, further comprising transmitting the distribution archive file to an enterprise computing system for execution by the enterprise computing system.

5. The method of claim 1, further comprising:

determining a failure or error for the current version of the application;

utilizing a previous version of the application from said distribution archive file to perform requested tasks instead of the current version that resulted in the failure or error.

6. The method of claim 1, wherein said distribution archive file is created without any foreknowledge of specific components present on a machine to which the distribution archive file is to be distributed.

7. A computer program product, comprising instruction code stored on a machine readable storage medium which, upon being executed cause a computing machine to:

determine an existence for a current version of an application having at least one previous version, wherein each previous version is associated with a version specific revision control file, wherein each revision control file indicates a set of applications and application support components that correspond to a specific version of the application;

identify integration applications and application support components to be included in a distribution archive file comprising integration applications, application support files, and revision control files for said current version of the application and for each of the at least one previous version of the application, wherein said identifying includes identifying available current and previous versions of the applications and the application support components, wherein the applications are stored in a proprietary format for use with an integration application design tool on a machine readable storage medium;

rename the applications and application support components using a naming convention which retains a base name and adds a name annotation which distinguishes versions of the application and application support components, wherein said renaming prevents name conflicts when the applications and application support components for a plurality of different versions of the application are placed in the distribution archive file;

generate a current revision control file for the current version of the application which lists the renamed application and application support components and indicates which of the renamed application and application support components are included in the current version of the application; and archive the renamed application, application support components, and current revision control file together in the distribution archive file as application and application support components for the current version of the application, wherein after said archiving said distribution archive file comprises a plurality of different versions of the application including said at least one previous version and said current version, and wherein the distribution archive file comprises a version specific revision control file for each of the plurality of different versions, one of said version specific revision control files comprising said current revision control file.

8. The computer program product of claim 7, wherein applying the naming convention comprises adding a name annotation to a file name of each of the application and application support components, wherein the name annotation is standardized, wherein applying the naming convention comprises integrating a time stamp into the name annotation and comprises including a package identifier in the name annotation.

9. The computer program product of claim 7, wherein the instruction code further causes the machine to transform the identified applications and application support components into a binary form in a memory of the computing system prior to archiving, wherein the distribution archive file is formatted in a portable format.

10. The computer program product of claim 7, further wherein the instruction code further causes the machine to transmit the distribution archive file to an enterprise computing system for execution by the enterprise computing system.

11. The computer program product of claim 7, further wherein the instruction code further causes the machine to:
determine a failure or error for the current version of the application; and
utilize a previous version of the application from said distribution archive file to perform requested tasks instead of the current version that resulted in the failure or error.

12. The computer program product of claim 7, wherein said distribution archive file is created without any foreknowledge of specific components present on a machine to which the distribution archive file is to be distributed.

* * * * *